United States Patent
Bossoutrot et al.

(10) Patent No.: US 6,340,452 B1
(45) Date of Patent: *Jan. 22, 2002

(54) SODIUM PERCARBONATE AND PROCESS FOR PRODUCING IT

(75) Inventors: Jean-Michel Bossoutrot, St.-Genis Laval; François Garcia, Brignais, both of (FR)

(73) Assignee: Solvay (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,063

(22) Filed: Mar. 18, 1997

(30) Foreign Application Priority Data

Mar. 19, 1996 (FR) .............................. 96 03397

(51) Int. Cl.$^7$ ................................ C01B 15/10
(52) U.S. Cl. .................. 423/415.2; 423/266; 23/302 T
(58) Field of Search .............. 423/415.2, 266; 428/402; 23/295 R, 302 T

(56) References Cited

U.S. PATENT DOCUMENTS

| 2,986,448 A | 5/1961 | Gates et al. | 423/415.1 |
|---|---|---|---|
| 3,917,663 A | 11/1975 | Kegelart et al. | 423/415.2 |
| 4,117,097 A | 9/1978 | Kiebe et al. | 423/415.2 |
| 4,118,465 A | 10/1978 | Malafosse | 423/415.2 |
| 4,118,466 A | 10/1978 | Klebe et al. | 423/415.2 |
| 4,146,571 A | 3/1979 | Will et al. | 423/415.2 |
| 4,416,606 A | 11/1983 | Sugano et al. | 425/202 |
| 4,440,732 A | 4/1984 | Takeda et al. | 423/415.2 |
| 5,294,427 A | 3/1994 | Sasaki et al. | 423/415.2 |
| 5,690,701 A | * 11/1997 | Bigini et al. | 423/415.2 |
| 5,906,660 A | * 5/1999 | Pardini et al. | 423/415.2 |

FOREIGN PATENT DOCUMENTS

| AU | 31754 | * 4/1996 |
|---|---|---|
| CA | 1070084 | 1/1980 |
| DE | 2644148 | 8/1978 |
| EP | A1-703190 | 3/1996 |
| EP | 0748764 A1 | 12/1996 |
| GB | 1469352 | 4/1977 |
| JP | 58-49605 | 3/1983 |
| WO | WO 95/23210 | 8/1995 |

* cited by examiner

*Primary Examiner*—Stuart L. Hendrickson
(74) *Attorney, Agent, or Firm*—Pennie & Edmonds LLP

(57) ABSTRACT

The invention relates to a novel sodium percarbonate in the form of agglomerates of small crystals. The average particle size of the agglomerates is greater than 600 μm. The apparent density of the agglomerates is between 0.75 g/cm$^3$ and 1.1 g/cm$^3$, and the active oxygen is greater than 14%. The invention also relates to a process for the continuous manufacture of sodium percarbonate in a fluidized bed.

27 Claims, 2 Drawing Sheets

SODIUM PERCARBONATE AND PROCESS FOR PRODUCING IT

1. BACKGROUND OF THE INVENTION

1.1 Technical Field

The present invention relates to a novel sodium percarbonate, of overall formula $Na_2CO_3 \cdot 1.5\ H_2O_2$, and to a process for manufacturing it. Sodium percarbonate is also known by the names sodium carbonate sesqui (peroxyhydrate), sodium carbonate peroxyhydrate, or sodium carbonate peroxide.

1.2 Description of The Related Art

The sodium percarbonate known to date is either:

- a monocrystal in the form of a hexagonal prism with a density of between 0.9 and 1 $g/cm^3$ (FR 2318112), or
- a monocrystal in the form of a regular rhombohedral (FR 2355774), or
- a hollow granule with an apparent density of about 0.4 $g/cm^3$ and with an average diameter of about 480 μm (FR 2486056), or
- in the form of a compact grain with an average particle size of about 450 μm (BE 859155).

A sodium percarbonate of very high quality, consisting of agglomerated of small crystals, has now been found.

Moreover, it is known to manufacture sodium percarbonate by reaction of a solution or suspension of sodium carbonate with aqueous hydrogen peroxide solution. The addition of inert salts such as sodium chloride to lower the solubility of the sodium percarbonate is also known.

Processes are known for the batchwise manufacture of sodium percarbonate (See, for example, BE 859155 and FR 2368438).

Processes are also known for the continuous manufacture of sodium percarbonate, working either under vacuum (FR 2318112) or with two reactors in series (EP 496430) and leading, respectively, to monocrystals and to crystals of sodium percarbonate less than 75 μm in size.

A process for the continuous manufacture of sodium percarbonate has now been discovered based on the generation and agglomeration of small crystals of the said percarbonate from an aqueous supersaturated solution of sodium percarbonate.

2. DESCRIPTION OF THE INVENTION

The sodium percarbonate of the present invention consists of agglomerates of small crystals of sodium percarbonate. The size of the small crystals is generally between about 1 μm and about 100 μm and preferably between about 5 μm and about 20 μm. The material of the present invention is characterized by very good resistance to attrition, preferably with a weight loss of fines of less than 1% according to the ISO standard test 5937 (method of friability in a fluid bed).

The sodium percarbonate in agglomerate form according to the invention has an apparent density of greater than about 0.6 $g/cm^3$ and preferably between about 0.75 $g/cm^3$ and about 1.1 $g/cm^3$.

The sodium percarbonate agglomerates of the invention have the advantage of dissolving rapidly. Thus, the time required to obtain 90% dissolution of 2 g of sodium percarbonate agglomerates introduced into one liter of water is generally less than or equal to 90 seconds at 15° C. and preferably between 40 and 70 seconds.

The sodium percarbonate in accordance with the invention is formed of agglomerates whose average particle size varies with the conditions chosen to manufacture them.

These conditions, described hereunder, make it possible to obtain agglomerates whose particle size may be between wide limits from about 160 μm to about 1400 μm with a particularly narrow particle size distribution. For example, in the case of agglomerates with an average particle size equal to about 765 μm, generally at least 85% are between about 480 μm and about 1400 μm in size.

Advantageously, the average particle size of these agglomerates is greater than 600 μm and preferably greater than 700 μm.

The content of fines smaller than 160 μm in size present with the agglomerates as obtained from the process which is suitable for manufacturing them is less than 2% by weight, usually even less than 1% by weight.

The active oxygen content of these sodium percarbonate agglomerates is generally greater than 14% and is defined as being the percentage by mass of the amount of oxygen available relative to the sodium percarbonate agglomerates.

A second subject of the present invention is a process for the continuous manufacture of sodium percarbonate in the form of agglomerates consisting of small crystals and having at least one of the characteristics described above.

This process is characterized in that it comprises a reactor within which is a bed of small crystals and/or agglomerates of sodium percarbonate. A supersaturated solution of sodium percarbonate is formed by placing a suspension or solution of sodium carbonate in contact with an aqueous hydrogen peroxide solution. The bed is maintained in suspension by an ascending stream of the aqueous supersaturated solution of the said percarbonate. The supersaturated state of the aqueous solution decreases as it moves in a continuously ascending motion at a speed such that a desired particle-size classing of agglomerates is ensured.

In general, the process for producing sodium percarbonate agglomerates according to the present invention comprises the following steps:

a) forming an aqueous supersaturated solution of sodium percarbonate in a reactor by placing a suspension or a solution of sodium carbonate in contact with an aqueous hydrogen peroxide solution, b) charging the reactor with a bed of sodium percarbonate, wherein the sodium percarbonate is present in the form of small crystals, agglomerates, or mixtures thereof, and c) maintaining the bed of sodium percarbonate in suspension by contacting the bed with an ascending stream of the aqueous supersaturated solution of sodium percarbonate, wherein the solution forms a stream which ascends in a path and the linear ascending speed of the stream is between 2 m/h and 20 m/h.

The sodium percarbonate agglomerates thusly manufactured are removed from the suspension in the lower part of the bed.

At the end of its ascending movement, the aqueous solution is supersaturated with sodium percarbonate and has a sodium percarbonate concentration generally between the value corresponding to the solubility of sodium percarbonate in the same medium at the same temperature and about 1.6 times that value. At the end of its ascending motion, the aqueous solution preferably has a sodium percarbonate concentration of between about 1 and about 1.4 times the value corresponding to the solubility of sodium percarbonate in the same medium at the same temperature. The amount of solid material present at this level in the reactor is generally less than 150 g per liter of aqueous solution and preferably between about 10 and about 25 g per liter of aqueous solution.

In order to form the sodium percarbonate needed to ensure the supersaturated state of the aqueous supersaturated solution of sodium percarbonate, amounts of hydrogen peroxide and of sodium carbonate are used such that the molar ratio of hydrogen peroxide to sodium carbonate dissolved in the mother liquor, at the end of the ascending motion of the aqueous supersaturated solution, is greater than 1 and preferably between about 1.2 and about 1.6.

The supplying of sodium percarbonate as an aqueous solution to ensure this supersaturated state may be performed by formation of the said percarbonate in the aqueous supersaturated solution of percarbonate itself or outside this solution. The formation of sodium percarbonate in the aqueous supersaturated solution of sodium percarbonate is particularly preferred and it is performed by continuous introduction of aqueous hydrogen peroxide solution and of a suspension or solution of sodium carbonate, optionally containing sodium percarbonate in solution or suspension. Preferably, the aqueous hydrogen peroxide solution is introduced into the ascending path of the aqueous supersaturated solution of sodium percarbonate at a level very close to the zone of introduction of the sodium carbonate suspension or solution. The introductions of the aqueous hydrogen peroxide solution and of the sodium carbonate suspension or solution may also take place at several levels.

Preferably, the sodium carbonate suspension or solution is introduced into the zone between the level located at the upper limit of removal of the agglomerates and the level located at about the midpoint of the ascending path of the supersaturated solution of sodium percarbonate.

The concentration in the supersaturated state of the aqueous sodium percarbonate solution in the zone of introduction of the hydrogen peroxide solution and of the sodium carbonate suspension or solution is normally greater than 1.2 times the value of the solubility of the sodium percarbonate in this same medium at the same temperature. It is preferably between about 1.3 and about 6 times that value.

Crystals and/or agglomerates of sodium percarbonate may be generated in the presence of at least one crystallization agent. The agent may be introduced at one or more levels in the ascending path of the aqueous supersaturated solution of sodium percarbonate. These levels are preferably located in the zone of introduction of the aqueous hydrogen peroxide solution and of the sodium carbonate suspension or solution and/or above this zone. Among the crystallization agents, sodium hexametaphosphate is particularly preferred. The amount of crystallization agent or agents used is such that their concentration in the aqueous supersaturated solution of sodium percarbonate is greater than 0.1 g/l and is usually between about 0.5 g/l and about 2.7 g/l.

An anionic surfactant may also be used to control the crystallization of the sodium percarbonate. At least one surfactant is preferably introduced at the level of the zone of introduction of the sodium carbonate suspension or solution. Anionic surfactants containing at least one sulfate or sulphonate function attached to a hydrocarbon chain are particularly preferred. The amount of surfactant or surfactants used is such that their concentration in the mother liquor is greater than 0.1 g/l and is usually between about 0.7 g/l and about 1 g/l. Isobutyl oleate sulfate is advantageously chosen among the surfactants.

To lower the solubility of the sodium percarbonate, at least one release agent such as a sodium salt may also be used. Sodium chloride is particularly preferred. The amount of release agent or agents used is such that their concentration in the mother liquor is greater than 20 g per liter and preferably between about 70 g/l and about 170 g/l.

The continuous introduction of hydrogen peroxide into the solid-liquid suspension is ensured by an aqueous hydrogen peroxide solution with a concentration by weight of between about 35% and about 70%. The aqueous hydrogen peroxide solution may also contain sodium carbonate, a stabilizer, in particular, sodium silicate or magnesium sulfate, and a release agent, such as sodium chloride.

The continuous introduction of sodium carbonate into the solid-liquid suspension is ensured by an aqueous concentrated suspension or solution of sodium carbonate, the titre of which is greater than 10% and preferably between about 15% and about 24%, optionally containing sodium percarbonate in solution or in suspension. The concentrated sodium carbonate solution may be prepared by dissolving commercial sodium carbonate in water or in some or all of the solution taken from the solid-liquid suspension at the end of its ascending motion, at a temperature above 17° C. The dissolution temperature is preferably between about 30° C. and about 70° C.

Any type of sodium carbonate having an iron (Fe) content of less than 10 ppm may be suitable. Anhydrous sodium carbonate obtained from Solvay or Rhône-Poulenc is preferably used.

The concentrated suspension or solution of sodium-carbonate may also contain stabilizers such as, in particular, sodium silicate or magnesium sulfate, release agents such as sodium chloride and crystallization agents such as sodium hexametaphosphate.

The stirred state of the solid-liquid suspension during the ascent of the liquid is ensured by a paddle-stirrer, a propeller-stirrer or a stirrer in the form of a stepladder. This stirring must be conducted such that the actual state of suspension and the particle size classing effect are maintained. Furthermore, stirring must be conducted such that the small crystals of sodium percarbonate are maintained in a position of contact or in a proximity which is sufficient for them to agglomerate.

The linear ascending speed of the liquid in the cylindrical part of the reactor may be between about 2 m/h and about 20 m/h. A linear ascending speed of between about 3 m/h and about 10 m/h is advantageously used. The expression "linear ascending speed" is understood to refer to the ratio of the fluidization volumetric flow rate to the cross-sectioned area of the reactor.

The temperature of the solid-liquid suspension is between about 14° C. and about 20° C. It is adjusted with precision using one or more heat exchangers in parallel. A temperature of the solid-liquid suspension of about 17° C. is particularly preferred and it is advantageously controlled to within ±1° C.

At the end of the ascending motion of the solid liquid suspension, the solid material may optionally be separated from the liquid by standard techniques such as settling, filtration, centrifugation or by using a hydrocyclone.

Some or all of this liquid (optionally separated from solid material) and, optionally, added water, constitute the liquid flow entering the bottom of the reactor in which the agglomerates according to the invention are formed.

According to the process of the present invention, a column reactor or a reactor of cylindroconical shape which is optionally fitted with a small neck in its upper part may be used. A cylindroconical reactor is usually used. Preferably, a cylindroconical reactor fitted with a small neck is used.

3. DESCRIPTION OF THE DRAWINGS

Figure 1:
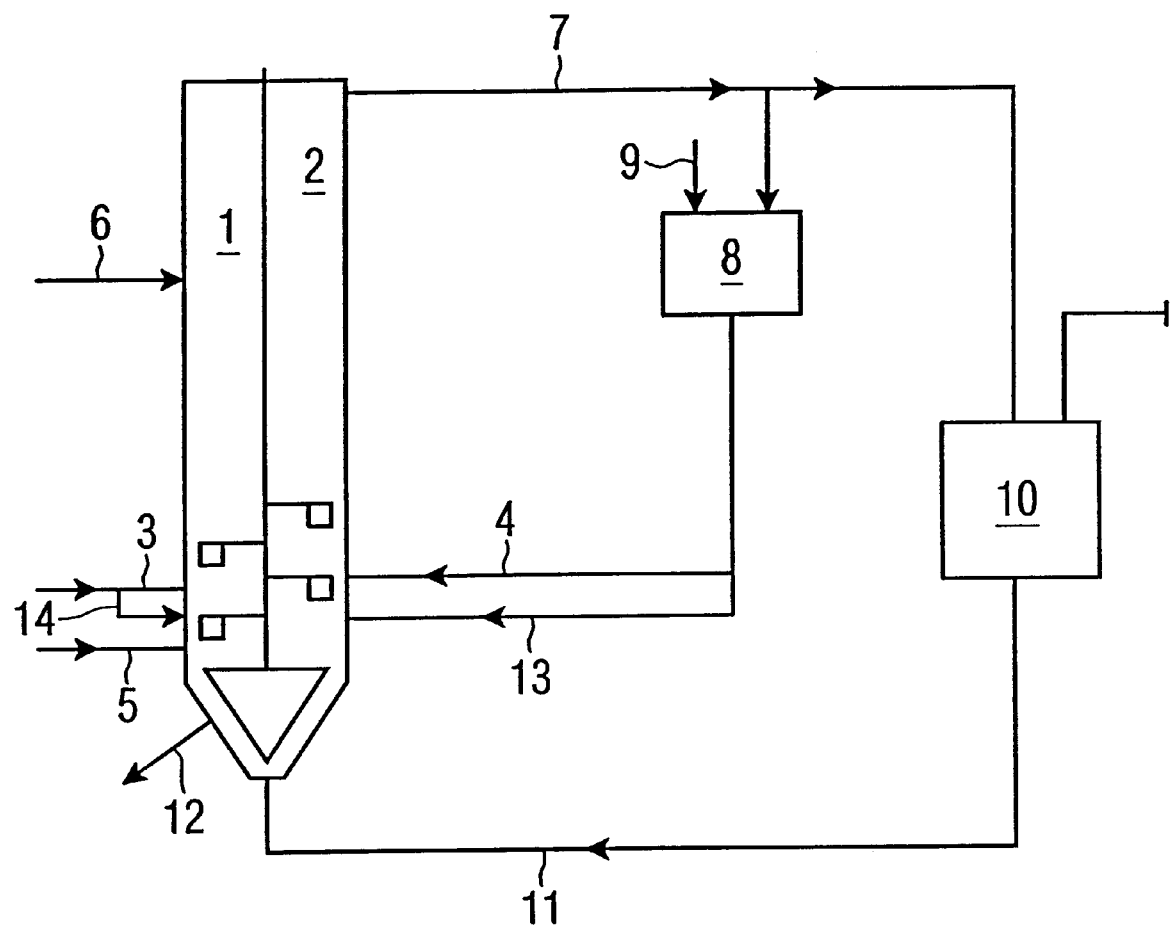
FIG. 1 illustrates schematically an embodiment of the process of the invention.

In FIG. 1, 1 denotes a cylindroconical reactor and 2 denotes the stirrer with which this reactor is fitted. 3 and 14 denote the inlets into reactor 1 of an aqueous hydrogen peroxide solution containing the stabilizers. 4 and 13 denote the inlets of a sodium carbonate solution containing sodium silicate and, optionally, percarbonate in solution or suspension. 5 denotes the inlet of anionic surfactant into reactor 1. 6 denotes the inlet of crystallization agent into reactor 1. 7 denotes the pipe by which liquid, optionally containing solid material, leaves the reactor at the end of the ascending path. 8 denotes the vessel in which the commercial sodium carbonate, introduced by inlet 9, is dissolved in some of the liquid originating from pipe 7. 10 denotes the overflow tank in which the other part of the liquid originating from pipe 7 is retained before being introduced into the bottom of reactor 1 by pipe 11. 12 denotes the outlet of the liquid containing the sodium percarbonate agglomerates. These agglomerates are then isolated from the liquid or mother liquor containing them by draining using a centrifugal drainer and then dried in a fluidized bed at a temperature between about 40 and about 70° C., preferably between about 50 and about 60° C. The mother liquor recovered at the drainer outlet may be reintroduced into overflow tank 10.

4. DESCRIPTION OF THE PREFERRED EMBODIMENTS

EXAMPLE 1

The process is performed according to the process scheme of FIG. 1. The cylindroconical reactor 1 has a total height (cylindrical plus conical parts) equal to 51 cm; its cylindrical part has a height equal to 43 cm and a diameter equal to 10 cm; it is fitted with a small neck, 13 cm in height, in its upper part (not shown) and is equipped with the stirrer 2 and injectors for introducing aqueous hydrogen peroxide solution, sodium carbonate solution, surfactant solution and crystallization agent solution.

The operation is commenced by introducing 760 g of sodium percarbonate crystals with a density equal to 0.75 g/cm$^3$, prepared beforehand, into reactor 1 containing mother liquor containing (% by mass):

7.2% sodium carbonate 3.48% of 70% hydrogen peroxide solution 7.2% sodium chloride 0.13% isobutyl oleate sulfate 500 ppm of sodium hexametaphosphate (PROLABO RECTAPUR)

495 ppm of sodium silicate 99 ppm of magnesium sulfate.

The following are then introduced continuously into reactor 1, stirred at 70 revolutions/min:

via 3 and 14—about 550 cm$^3$/h of the aqueous hydrogen peroxide solution (titre of about 70%) containing 5% sodium chloride and 70 ppm of magnesium sulfate, via 4 and 13—6.1 l/h of concentrated 17–19% by weight sodium carbonate solution, via 5—12.4 g/h of isobutyl oleate sulfate, via 6—20 cm$^3$/h of the 24.7% by mass solution of sodium hexametaphosphate.

During the course of the test, the flow rate of the aqueous hydrogen peroxide solution is adjusted, if required, to ensure a molar ratio of hydrogen peroxide to sodium carbonate, dissolved in the mother liquor at the end of the ascending motion of the aqueous supersaturated solution, equal to about 1.4.

The initial sodium carbonate solution contains 20% sodium carbonate, 7.2% sodium chloride, 800 ppm of sodium hexametaphosphate and 520 ppm of sodium silicate.

The temperature in reactor 1 is maintained between 16.5° C. and 17.5° C. and the temperature in vessel 8 is maintained at about 65° C. The linear ascending speed is equal to 5 m/h in the cylindrical part of reactor 1 and 40 l/h of the liquid are withdrawn at the end of its ascending motion.

The agglomerates of sodium percarbonate manufactured are withdrawn over time from reactor 1, via 12, accompanied by mother liquor. These agglomerates are separated from the mother liquor in a centrifuge and are then dried in a fluidized bed at 55° C. The mother liquor recovered is returned to overflow tank 10.

These agglomerates have an apparent density equal to 0.94 g/cm$^3$. The content of active oxygen is 14.6%. The time required to dissolve 90% of 2 g of these agglomerates in one liter of water at 15° C. is 70 s.

The average particle size of these agglomerates is 850 μm and is distributed as follows:

<160 μm=1%

160–480 μm=9%

480–750 μm=27%

750–1020 μm=41%

1020–1400 μm=21%

>1400 μm=1%

The loss of weight after the attrition test conducted according to the procedure of ISO standard 5937 is less than 1%.

Figure 2:
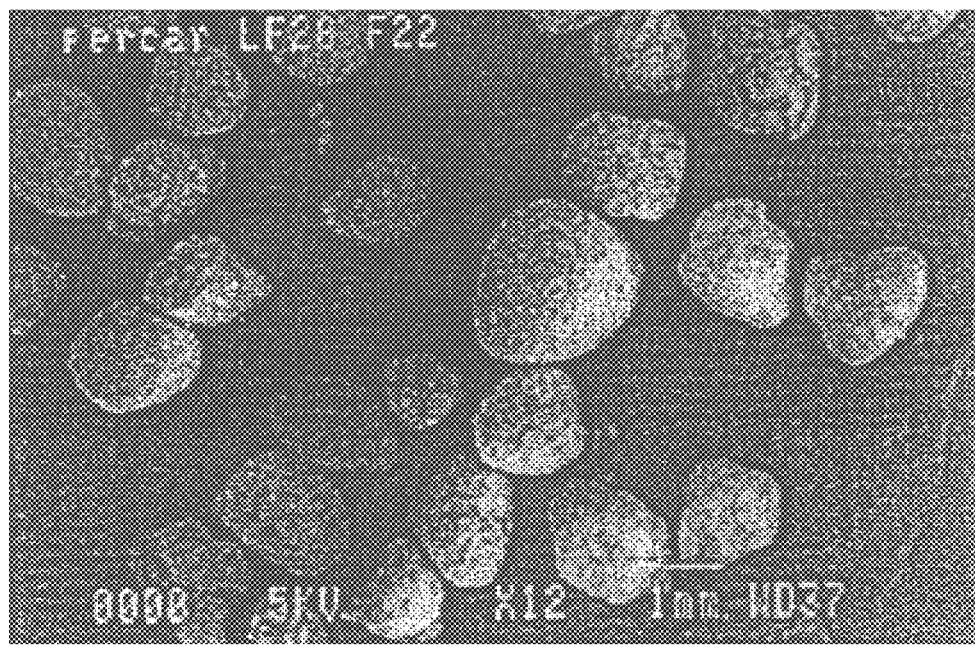
FIGS. 2 and 3 are scanning electron microscope photographs of the agglomerates obtained from Example 1, with a magnification of 12× and 50× , respectively.
Figure 3:
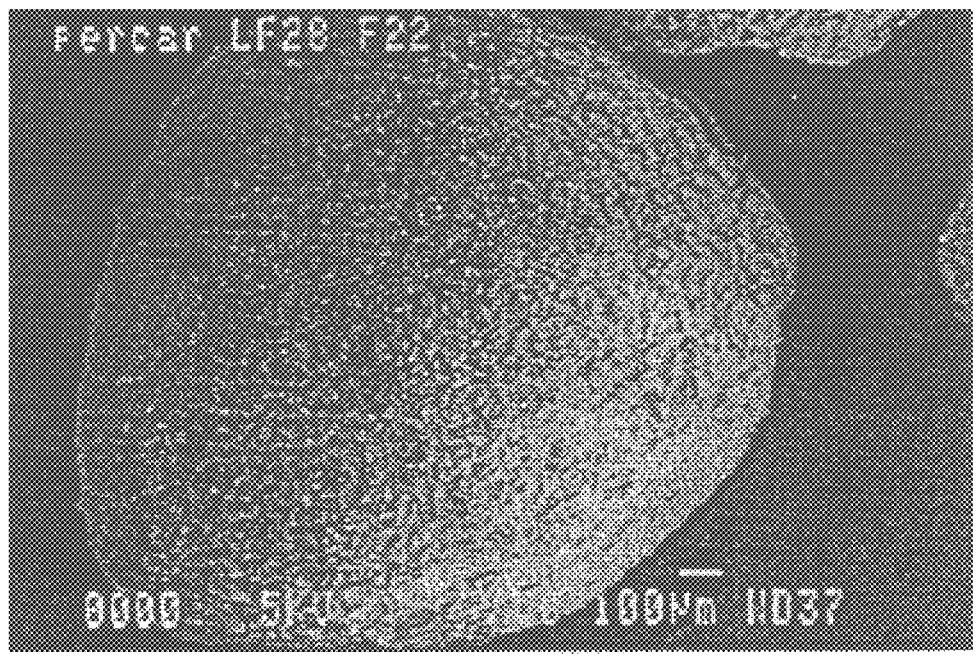

Scanning electron microscope images of the agglomerates obtained are shown in FIGS. 2 and 3.

EXAMPLE 2

The process is performed in the same way as in Example 1, except that molar ratio of hydrogen peroxide to sodium carbonate dissolved in the mother liquor, at the end of the ascending motion of the aqueous supersaturated solution, is equal to 1.3.

The apparent density of the agglomerates obtained after draining is 0.9 g/cm$^3$ and the average particle size is 830 μm.

The time required to dissolve 90% of 2 g of these agglomerates in one liter of water at 150° C. is 65 seconds.

The loss of weight after the ISO 5937 attrition test is less than 1%.

EXAMPLE 3

The process is performed in the same way as in Example 1, except that the flow rate for supplying solid sodium carbonate to vessel 8 is changed to 1000 g/h.

The apparent density of the agglomerates obtained after drying is 0.75 g/cm$^3$ and the average particle size is 610 μm.

The time required to dissolve 90% of 2 g of these agglomerates in 1 liter of water at 15° C. is 60 seconds.

The loss of weight after the ISO 5937 attrition test is less than 2%.

What is claimed is:

1. Sodium percarbonate agglomerates comprising crystals of sodium percarbonate, wherein:

a) the average particle size of the agglomerates is greater than 600 μm, b) the apparent density of the agglomerates is between about 0.75 g/cm$^3$ and about 1.1 g/cm$^3$, c) the agglomerates comprise greater than 14% by mass of active oxygen, d) the average particle size of the crystals of sodium percarbonate is from about 1 µm to about 100 µm, e) the time required to dissolve 90% of 2 g of agglomerates in one liter of water at 15° C. is less than or equal to 90 seconds, and f) the particle size of the agglomerates is between about 160 µm and about 1400 µm;

wherein the sodium percarbonate agglomerates are produced by a process comprising:

1) forming an aqueous supersaturated solution of sodium percarbonate in a reactor by placing a suspension or a solution of sodium carbonate in contact with an aqueous hydrogen peroxide solution, 2) stirring the entire reactor contents with crystals of sodium percarbonate generated from the aqueous supersaturated solution of sodium percarbonate maintained for a sufficiently long period of time in a position of contact or in a proximity which is sufficient for them to agglomerate and to create a bed of sodium percarbonate, wherein the sodium percarbonate is present in the form of crystals, agglomerates, or mixtures thereof, 3) maintaining the bed of sodium percarbonate crystals and/or agglomerates in suspension by contacting the bed with an ascending stream of the aqueous supersaturated solution of sodium percarbonate, wherein the solution forms a stream which ascends in a path and the linear ascending speed of the stream is between about 2 m/h and about 20 m/h, 4) removing the agglomerates from the suspension in a lower part of the bed and, thereafter, separating the agglomerates from a mother liquor, and 5) introducing into the bottom of the reactor a liquid flow comprising the mother liquor, at least a portion of the suspension removed at the end of its ascending motion and, optionally, water.

2. The sodium percarbonate agglomerates according to claim 1, wherein the average particle size of the crystals of sodium percarbonate is from about 5 µm to about 20 µm.

3. The sodium percarbonate agglomerates according to claim 1, characterized in that the time required to dissolve 90% of 2 g of agglomerates in one liter of water at 15° C. is between 40 and 70 seconds.

4. The sodium percarbonate agglomerates according to claim 1, characterized in that the weight loss of fines, according to the attrition test of ISO standard 5937, is less than 1%.

5. A process for the manufacture of the sodium percarbonate agglomerates consisting essentially of crystals of sodium percarbonate, wherein:

a) the particle size of the agglomerates is between about 160 µm and about 1400 µm, b) the average particle size of the agglomerates is greater than 600 µm, c) the apparent density of the agglomerates is between about 0.75 g/cm$^3$ and about 1.1 g/cm$^3$, d) the agglomerates comprise greater than 14% by mass of active oxygen, and e) the average particle size of the crystals of sodium percarbonate is from about 1 µm to about 100 µm;

wherein the process comprises:

1) forming an aqueous supersaturated solution of sodium percarbonate in a reactor by placing a suspension or a solution of sodium carbonate in contact with an aqueous hydrogen peroxide solution, 2) adding at least one crystallization controlling anionic surfactant to the reactor, 3) stirring the entire reactor contents with crystals of sodium percarbonate generated from the aqueous supersaturated solution of sodium percarbonate maintained for a sufficiently long period of time in a position of contact or in a proximity which is sufficient for them to agglomerate and to create a bed of sodium percarbonate, wherein the sodium percarbonate is present in the form of crystals, agglomerates, or mixtures thereof, 4) maintaining the bed of sodium percarbonate crystals and/or agglomerates in suspension by contacting the bed with an ascending stream of the aqueous supersaturated solution of sodium percarbonate, wherein the solution forms a stream which ascends in a path and the linear ascending speed of the stream is between about 2 m/h and about 20 m/h, and 5) removing the agglomerates from the suspension in a lower part of the bed and, thereafter, separating the agglomerates from a mother liquor;

wherein at least one anionic surfactant comprises a hydrocarbon chain bearing a functional group selected from the group consisting of sulfate, sulphonate and mixtures thereof.

6. The process according to claim 5, characterized in that the molar ratio of hydrogen peroxide to sodium carbonate dissolved in the aqueous supersaturated solution of sodium percarbonate at the end of its ascending motion within the reactor is greater than 1.

7. The process according to claim 6, characterized in that the molar ratio of hydrogen peroxide to sodium carbonate dissolved in the aqueous supersaturated solution of sodium percarbonate is between about 1.2 and about 1.6.

8. The process according to claim 5, characterized in that the supersaturated state of the aqueous supersaturated solution of sodium percarbonate is maintained by the continuous introduction into the supersaturated solution of an aqueous hydrogen peroxide solution and of sodium carbonate, in the form of a suspension or a solution.

9. The process according to claim 8, characterized in that the sodium carbonate suspension or solution comprises sodium percarbonate in solution or suspension.

10. The process according to claim 8, characterized in that the sodium carbonate suspension or solution is introduced at least one level into the ascending path of the aqueous supersaturated solution of sodium percarbonate.

11. The process according to claim 10, characterized in that the sodium carbonate suspension or solution is introduced into a zone located between the level of the upper limit of removal of the agglomerates and the level located at the mid-point of the ascending path of the supersaturated solution of sodium percarbonate.

12. The process according to claim 10, characterized in that the aqueous hydrogen peroxide solution is introduced at at least one level in the ascending path of the supersaturated solution of sodium percarbonate, which is located in the zone of introduction of the sodium carbonate suspension or solution.

13. The process according to claim 5, characterized in that at least one structure comprising sodium percarbonate selected from the group consisting of crystals and agglomerates is generated in the presence of a crystallization agent.

14. The process according to claim 13, characterized in that the crystallization agent is sodium hexametaphosphate.

15. The process according to claim 13, characterized in that the crystallization agent is introduced at a level in the ascending path of the supersaturated solution of sodium percarbonate which is located above the zone of introduction of the aqueous hydrogen peroxide solution.

16. The process according to claim 13, characterized in that the crystallization agent is introduced at a level in the ascending path of the supersaturated solution of sodium percarbonate which is located above the zone of introduction of the suspension or solution of sodium carbonate.

17. The process according to claim 16, characterized in that the crystallization agent is introduced at a level in the ascending path of the aqueous supersaturated solution, which is located in the zone of introduction of the aqueous hydrogen peroxide solution and of the sodium percarbonate suspension or solution.

18. The process according to claim 5, characterized in that the aqueous suspension at the end of the ascending motion of the sodium percarbonate supersaturated solution has a sodium percarbonate concentration between the value corresponding to about the solubility of the percarbonate in the medium at the same temperature and about 1.4 times that value.

19. The process according to claim 18, characterized in that the temperature of the sodium percarbonate suspension is between about 14° C. and about 20° C.

20. The process of claim 5, wherein the linear ascending speed of the stream is between about 2 m/h to less than 5 m/h.

21. The process according to claim 5, characterized in that the reactor is of a cylindroconical shape fitted with a neck in its upper part.

22. The process according to claim 5, wherein at least one anionic surfactant is isobutyl oleate sulfate.

23. The process according to claim 5, wherein the total surfactant concentration is greater than 0.1 g/l.

24. The process according to claim 23, wherein the total surfactant concentration is between about 0.7 g/l and about 1.0 g/l.

25. The sodium percarbonate agglomerates according to claim 1, wherein the average particle size of the agglomerates is greater than 700 $\mu$m.

26. The product according to claim 1, wherein the weight content of fines smaller than 160 $\mu$m present with the agglomerates is less than 2%.

27. The product according to claim 1, wherein the weight content of fines smaller than 160 $\mu$m present with the agglomerates is less than 1%.

\* \* \* \* \*